United States Patent

Meredith, Jr.

[11] Patent Number: 5,812,405
[45] Date of Patent: Sep. 22, 1998

[54] THREE VARIABLE OPTIMIZATION SYSTEM FOR THIN FILM COATING DESIGN

[75] Inventor: William A. Meredith, Jr., Faribault, Minn.

[73] Assignee: Viratec Thin Films, Inc., Faribault, Minn.

[21] Appl. No.: 448,233

[22] Filed: May 23, 1995

[51] Int. Cl.⁶ .......................... G06F 19/00; G06G 7/6466
[52] U.S. Cl. .................. 364/473.01; 364/473.02; 364/468.02; 364/468.03; 205/169; 205/170; 205/143
[58] Field of Search ................. 364/473.03, 473.01, 364/473.02, 479.09, 473.05, 474.25, 468.03, 468.02; 428/34, 426, 428, 432; 359/586, 580, 588, 589; 350/166, 164; 257/436, 437; 427/162, 163.1; 205/169, 170, 143

[56] References Cited

U.S. PATENT DOCUMENTS

| | | | |
|---|---|---|---|
| 3,712,711 | 1/1973 | Adachi | 350/164 |
| 3,960,441 | 6/1976 | Kamiya et al. | 350/164 |
| 4,047,805 | 9/1977 | Sekimura | 350/166 |
| 4,260,222 | 4/1981 | Kozawa | 350/164 |
| 4,313,647 | 2/1982 | Takazawa | 350/164 |
| 4,528,418 | 7/1985 | McGill | 136/256 |
| 4,590,117 | 5/1986 | Taniguchi et al. | 428/212 |
| 4,592,129 | 6/1986 | Legge | 29/572 |
| 4,729,341 | 3/1988 | Fournier et al. | 118/723 |
| 4,737,934 | 4/1988 | Ross et al. | 365/106 |
| 4,747,674 | 5/1988 | Butterfield et al. | 350/399 |
| 4,769,291 | 9/1988 | Belkind et al. | 428/630 |
| 4,797,619 | 1/1989 | Austin et al. | 324/409 |
| 4,830,876 | 5/1989 | Dietrich et al. | 427/96 |
| 4,919,778 | 4/1990 | Dietrich et al. | 204/192.27 |
| 4,940,636 | 7/1990 | Brock et al. | 428/426 |
| 4,990,234 | 2/1991 | Szczyrbowski et al. | 204/192.23 |
| 4,995,684 | 2/1991 | Tustison et al. | 350/1.6 |
| 5,011,745 | 4/1991 | Dietrich et al. | 428/630 |
| 5,071,535 | 12/1991 | Hartig et al. | 204/298.09 |
| 5,082,546 | 1/1992 | Szczyrbowski et al. | 204/298.08 |
| 5,090,984 | 2/1992 | Szczyrbowski et al. | 65/60.2 |
| 5,100,527 | 3/1992 | Stevenson et al. | 204/298.22 |
| 5,106,474 | 4/1992 | Dickey et al. | 204/298.22 |
| 5,126,032 | 6/1992 | Szczyrbowski et al. | 204/298.08 |
| 5,126,033 | 6/1992 | Szczyrbowski et al. | 204/298.08 |
| 5,156,727 | 10/1992 | Bjornard et al. | 204/298.11 |
| 5,168,003 | 12/1992 | Proscia | 428/126 |
| 5,169,509 | 12/1992 | Latz et al. | 204/298.03 |
| 5,169,694 | 12/1992 | Endo et al. | 428/34 |
| 5,170,291 | 12/1992 | Szczyrbowski et al. | 359/580 |
| 5,200,049 | 4/1993 | Stevenson et al. | 204/298.22 |
| 5,201,926 | 4/1993 | Szczyrbowski et al. | 65/60.2 |
| 5,208,101 | 5/1993 | Boulos et al. | 428/336 |
| 5,213,672 | 5/1993 | Hartig et al. | 204/298.22 |
| 5,216,542 | 6/1993 | Szczyrbowski et al. | 359/588 |
| 5,240,584 | 8/1993 | Szczyrbowski et al. | 204/298.08 |
| 5,248,545 | 9/1993 | Proscia | 428/212 |
| 5,254,392 | 10/1993 | Burns et al. | 428/212 |
| 5,262,032 | 11/1993 | Hartig et al. | 204/298.11 |
| 5,262,633 | 11/1993 | Kasai et al. | 250/208.1 |
| 5,264,099 | 11/1993 | Szczyrbowski et al. | 204/192.27 |
| 5,270,858 | 12/1993 | Dickey | 359/586 |
| 5,271,960 | 12/1993 | Proscia | 427/164 |
| 5,279,722 | 1/1994 | Szczyrbowski et al. | 204/192.27 |

(List continued on next page.)

OTHER PUBLICATIONS

TFCalc Version 2.7 User's Guide; Software Spectra, Inc. (1992).

O.S. Heavens, Optical Properties of Thin Solid Films, pp. 46–95 (1965).

*Primary Examiner*—Paul P. Gordon
*Assistant Examiner*—Ramesh Patel
*Attorney, Agent, or Firm*—Dorsey & Whitney LLP

[57] ABSTRACT

A method and system for designing and manufacturing a high-performance, optimized optical interference coatings that have a minimal number of layers. Index of refraction, absorption coefficient, and thickness values are selected for each of the layers in the design so as to cause the reflectance of a coated object to be zero for a given wavelength. Materials that with the selected properties are manufactured by mixing two or more preexisting available materials.

13 Claims, 9 Drawing Sheets

U.S. PATENT DOCUMENTS

| | | | |
|---|---|---|---|
| 5,286,360 | 2/1994 | Szczyrbowski et al. | 204/298.08 |
| 5,332,618 | 7/1994 | Austin | 428/216 |
| 5,364,518 | 11/1994 | Hartig et al. | 204/298.22 |
| 5,372,693 | 12/1994 | Brauer et al. | 204/298.11 |
| 5,372,694 | 12/1994 | Szczyrbowski | 204/298.12 |
| 5,382,126 | 1/1995 | Hartig et al. | 414/217 |
| 5,411,794 | 5/1995 | Kawaguchi et al. | 428/216 |
| 5,450,238 | 9/1995 | Bjornard et al. | 359/580 |
| 5,502,442 | 3/1996 | Sulzbach | 342/2 |
| 5,513,038 | 4/1996 | Abe | 359/580 |
| 5,557,466 | 9/1996 | Otani et al. | 359/586 |

For a layer of index $n_1 = n_1 - ik_1$ and thickness $d_1$ on a substrate of Index $n_2 = n_1 - ik_2$, the reflectance at a wavelength $\lambda$ may be found from the following equations:

$$g_1 = \frac{n_0^2 - n_1^2 - k_1^2}{(n_0 + n_1)^2 + k_1^2} \qquad h_1 = \frac{2 n_0 k_1}{(n_0 + n_1)^2 + k_1^2}$$

$$g_2 = \frac{n_1^2 - n_2^2 + k_1^2 - k_2^2}{(n_1 + n_2) + (k_1 + k_2)^2} \qquad h_2 = \frac{2(n_1 k_2 - n_2 k_1)}{(n_1 + n_2)^2 + (k_1 + k)^2}$$

$$p_2 = e^{a_1} \cos \gamma_1 \qquad q_2 = e^{a_1} \sin \gamma_1$$

$$t_2 = e^{a_1}(g_2 \cos \gamma_1 + h_2 \sin \gamma_1)$$

$$u_2 = e^{a_1}(h_2 \cos \gamma_1 + g_2 \sin \gamma_1)$$

where $a_1 = \dfrac{2\pi k_1 d_1}{\lambda}$ and $\gamma_1 = \dfrac{2\pi n_1 d_1}{\lambda}$ (radians)

$$p_{12} = p_2 + g_1 t_2 - h_1 u_2$$

$$q_{12} = q_2 + h_1 t_2 - g_1 u_2$$

$$t_{12} = t_2 + g_1 p_2 - g_1 q_2$$

$$u_{12} = u_2 + h_1 p_2 - g_1 q_2$$

$$R_1 = \frac{t_{12}^2 + u_{12}^2}{p_{12}^2 + q_{12}^2}$$

Optical Constants

| Material | n (496) | k (496) |
|---|---|---|
| Titanium Carbide | 2.95 | 2.38 |
| Vanadium Carbide | 2.84 | 2.21 |
| Titanium Nitride | 1.2 | 1.65 |
| Vanadium Nitride | 2.17 | 1.98 |
| Silicon Nitride | 2.04 | 0 |
| Tantalum | 2.75 | 1.98 |
| Aluminum | 0.755 | 6.03 |
| Silicon | 4.32 | 0.073 |
| Tungsten | 3.38 | 2.68 |
| Silver | 0.13 | 2.88 |
| Rhodium | 1.88 | 4.65 |
| Osmium | 5.36 | 2.82 |
| Nickel | 1.67 | 2.93 |
| Titanium Dioxide | 2.45 | 0 |
| Hafnium Dioxide | 2 | 0 |
|  | n (508) | k (508) |
| Silicon Dioxide | 1.46 | 0 |
|  | n (512) | k (512) |
| Chromium | 2.75 | 4.46 |
|  | n (506) | k (506) |
| Niobium | 2.89 | 2.9 |
|  | n (500) | k (500) |
| Magnesium Flouride | 1.38 | 0 |
| Magnesium Oxide | 1.75 | 0 |

THREE VARIABLE OPTIMIZATION SYSTEM FOR THIN FILM COATING DESIGN

FIELD OF THE INVENTION

The present invention relates to methods of designing and manufacturing high-performance optical interference coatings. The design of the coating is optimized so as to provide maximum coating performance with a minimum number of thin film layers.

BACKGROUND OF THE INVENTION

One of the most significant objectives of designers and manufacturers of coated glass is controlling the reflectance properties of the glass. For example, with a glass CRT face in a display, it is desirable to reduce glare from the reflection of ambient light off the glass CRT face. Several approaches have been used to reduce such glare, but the preferred approach is to apply an optical interference coating or thin film material directly to a CRT screen. One reason this approach is preferable to other approaches is that it is possible for the anti-reflective optical interference coating to be electrically conductive. Electrical conductivity facilitates the dissipation of static electrical charges and thereby reduces accumulation of dust on the CRT. An electrically conductive coating, when effectively grounded, also substantially reduces the ELF/VLF field emissions from the CRT.

There are a limited number of thin film materials, and generally none of the available thin film materials, taken alone, is sufficient to provide the desired anti-reflective effect over the desired wavelength range. Therefore, to compensate for the limitations of the small number of available thin film materials, what has been done in the past is to layer numerous thin film materials on the substrate in succession so that the resulting optical interference coating has the desired anti-reflective effect. In other words, it is possible to use a number of layered thin film materials to obtain optical interference or reflectance properties that are different from those of any one of the thin film materials.

Each thin film material is applied to the glass substrate through a thin film deposition technique such as electron beam deposition, chemical vapor deposition, or sputtering. The process of layering numerous thin film materials is complicated, and it requires painstaking control of the layering process. It therefore increases the cost of the manufacturing process. Thus, there is a need for a method by which an inexpensive and efficient optical interference coating can be applied to a CRT. Similarly, there is also a need for a wider selection of materials that can be used as layers in an anti-reflective coating because there is currently a limited number of thin film materials.

SUMMARY OF INVENTION

The present invention relates to a method of operating a computer to design an optical interference coating that is optimized for a given wavelength. The optical interference coating comprises one or more layers. The method includes the steps of (a) accepting as input a layer count value, wherein the layer count value is the number of layers that will make up the optical interference coating, and (b) finding, for each of the layers, three optimized values (index of refraction, coefficient of absorption, and thickness) that will cause the reflectance of a substrate coated with the optical interference coating to be at the desired value (e.g., zero) for the given wavelength. The three optimized values for each layer comprise an optimized absorption coefficient, an optimized index of refraction, and an optimized thickness. In at least one of the layers, the three optimized values are all greater than zero.

The present invention further relates to a method of manufacturing materials that have properties that match the optimized values for each of the layers. This is done mixing two or more available materials in proportions that will result in a custom thin film mixture that has the desired properties. The custom thin film material is used as a layer in the design.

It is an object of the present invention to provide an inexpensive and efficient procedure for applying an optical interference coating to a substrate.

It is a further object of the present invention to provide a method for manufacturing customized thin film materials.

It is a further object of the present invention to provide a method for manufacturing optimized optical interference coatings.

It is a still further object of the present invention to design high-performance optical interference coatings with a small number of layers.

DETAILED DESCRIPTION

The present invention relates to designing optimal materials for use as an optical interference coating. Typically, optical interference coatings such as anti-reflective coatings are constructed by layering known thin film materials in carefully controlled quantities so that the layers, as a group, produce the desired anti-reflective effect. The layers can be applied by a system using one or more of a variety of thin film deposition techniques, such as sputtering, electron beam deposition, or chemical vapor deposition, among others. One such system is described in commonly-assigned copending application Ser. No. 08/142,638, now U.S. Pat. No. 5,489,369, the specification of which is hereby incorporated by reference.

Each of the layers applied to a glass surface in the present invention is a thin film material having an index of refraction ("n"), an absorption coefficient ("k"), and a certain thickness ("d"). The index of refraction (n) is the ratio of the velocity of light in a vacuum to the velocity of light in the thin film material. The absorption coefficient (k), sometimes known as the absorption factor, is a measure of the attenuation of the amplitude of a wave over a path of one vacuum wavelength in the thin film material. The thickness (d) is simply the thickness of the thin film material. For a given wavelength, the reflectance of the glass surface is a function of the index of refraction, absorption coefficient, and thickness of the glass itself, and also of the index of refraction, absorption coefficient, and thickness of any thin film material applied to the glass. The reflectance of a glass surface that is coated with a thin film material can be calculated from the properties of the materials in the manner described in Chapter 4 of O. S. Heavens, *Optical Properties of Thin Solid Films*, (Dover 1965), which is hereby incorporated by reference.

Figure 1A:
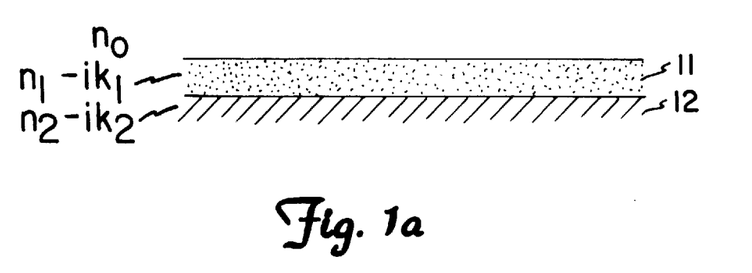
FIG. 1a is a representation of a single-layer optical interference coating applied to a substrate.

FIG. 1a shows a thin film material 11 on a glass substrate 12, which could be the face of a CRT. The medium 10 is air. The thin film material 11 has a index $N1=n1-i(k1)$, where N1 is a complex quantity, with the index of refraction (n1) as the real component, and the absorption coefficient (k1) as the imaginary component. Similarly, the substrate 12 has an index $N2=n2-i(k2)$, where n2 is the index of refraction of the substrate, and k2 is the absorption coefficient of the substrate. As set forth in FIG. 2, the reflectance R at a given wavelength $\lambda$ can be calculated from the properties of the thin film material and the substrate.

Figure 1B:
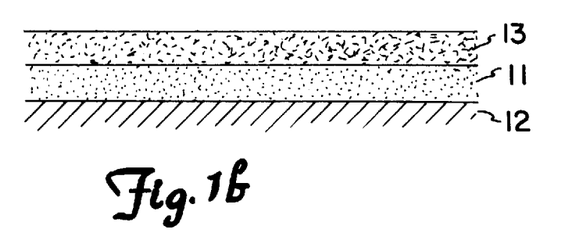
FIG. 1b is a representation of a double-layer optical interference coating applied to a substrate.
Figure 2:
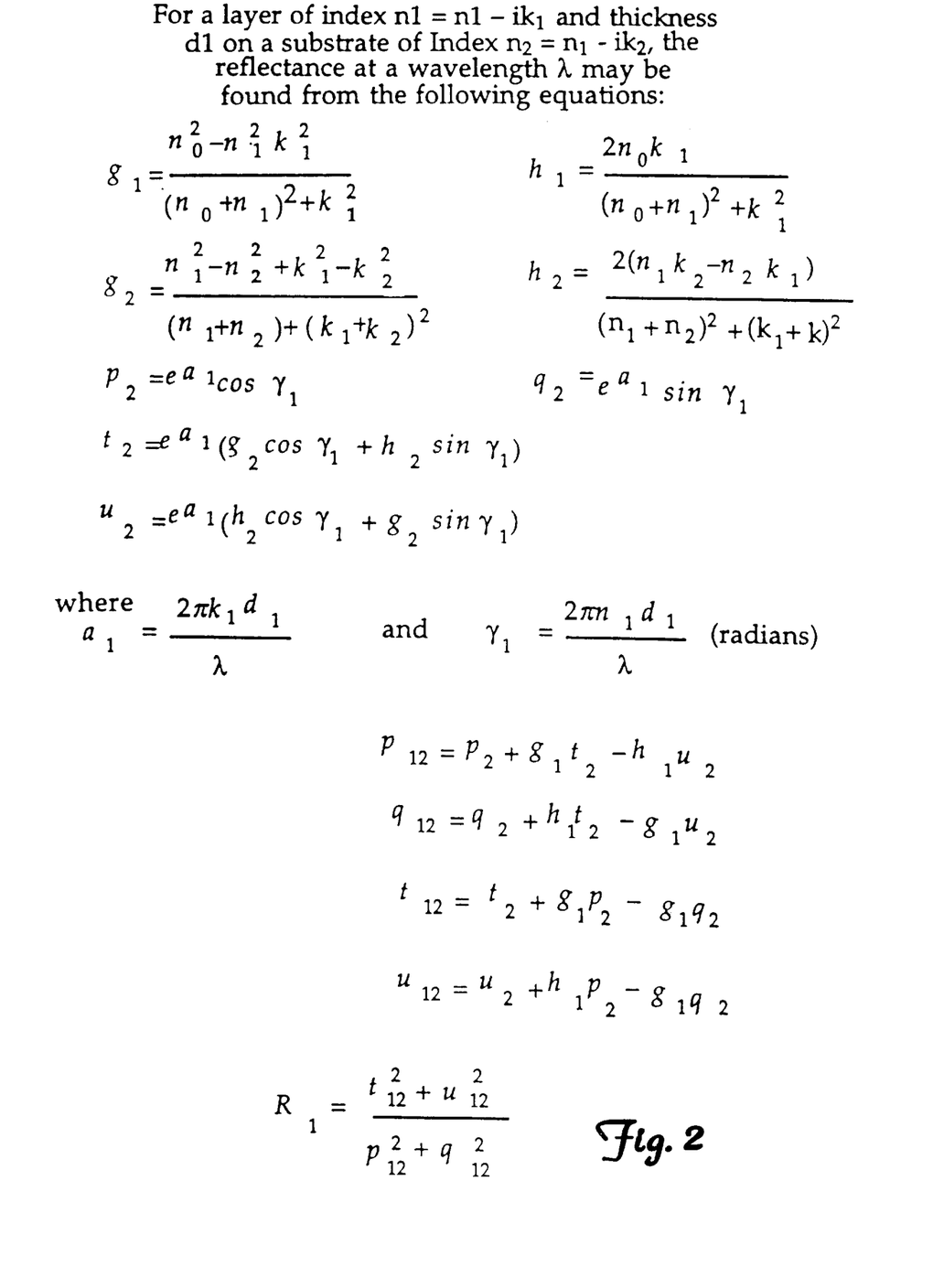
FIG. 2 are single-layer reflectance equations.

As one might expect, applying a second thin film layer 13 on top of the first layer further affects the reflectance of the CRT. See FIG. 1b. The equations of FIG. 2 are readily expanded to the case of two or more layers, albeit at some length. The manner in which the reflectance can be calculated for the case of multiple layers of thin film coatings is well known in the art, and is described in the O. S. Heavens text mentioned above, and the references cited therein. In addition, other references known to those in the art are available that describe the reflectance calculations for multiple layer coatings.

In the past, thin film materials chosen for anti-reflective applications have been clear or transparent materials, which have an absorption coefficient (k) equal to zero. Transparent optical interference materials have been chosen for such applications because they permit the clearest and most visible image on the CRT. Thin film materials with a sufficiently high k value, on the other hand, will tend to attenuate the intensity of the visible image. Also, designs involving thin film materials with an absorption coefficient greater than zero are not easily designed intuitively, and such designs involve complex mathematical calculations. See O. S. Heavens, *Optical Properties of Thin Solid Films*. However, using only transparent materials substantially limits the number of available materials. Further, it is not absolutely necessary to use only materials with an absorption coefficient that is zero, and in many cases, a very high performance coating can be obtained even with non-transparent optical interference materials.

Although considering optical interference materials that have a non-zero absorption coefficient lengthens the list of available materials, the number of available materials is still relatively limited. This presents significant problems for the design of high-performance optical interference coatings because a limited number of materials makes it difficult to design an optical interference coating with a small number of layers. Designing an optical interference coating involves carefully choosing thin film materials in such a manner that will, when the chosen thin film materials are applied to the CRT, result in the desired reflectance properties. However, where there is a limited number of thin film materials, thin film materials with the precise combination of properties that are necessary for a small layer count design are typically not available. Thus, it is often necessary to compensate for the lack of materials that have the appropriate properties by layering a large number of the available materials in order to obtain the desired reflectance properties. Compensating in this manner means that a design with a low layer count is not obtained.

The present invention, however, solves this problem with a procedure (typically computer-implemented) for designing and manufacturing thin film materials that fit into an optimized optical interference coating design. Thin film materials with the properties necessary for enabling a low layer count design are custom-manufactured by mixing two or more available thin film materials in an appropriate proportion. These manufactured thin film materials are then used as layers in a low layer count design.

The first step in designing the optimized optical interference coating in the present invention involves choosing the number of layers that will make up the coating. A computer employing the present invention (see FIG. 1c) would therefore accept as input the layer count value that the user desires. This input can be accepted in any manner known in the art, such as by keyboard, mouse, touch-screen, voice recognition, or any other manual input procedure. In addition, the layer count value can also be accepted as input by reading the desired layer count value from memory or from some other data storage medium. A small number of layers is obviously best because applying only a small number of thin film materials to the CRT streamlines the manufacturing process. Thus, one might, for example, choose to design a two-layer optical interference coating.

Another step that is carried out by the computer in designing the optical interference coating is to find, for each of the layers (as specified by the layer count), an absorption coefficient, index of refraction, and thickness value that will cause the reflectance of a substrate coated with the optical interference coating to be sufficiently close to the desired reflectance value for the given wavelength. For a two-layer anti-reflective design, the values of n, k, and d for each layer are chosen so that the reflectance value is equal to zero (or substantially equal to zero) in the two-layer equations for reflectance. The chosen or optimized values of n, k, and d thus describe two optimized thin film materials. These chosen values are illustrated in the three-dimensional graph of FIG. 3, in which the y axis corresponds to the absorption coefficient (k), the x axis corresponds to the index of refraction (n), and the z axis corresponds to the thickness value (d). Optimized thin film material 201 has properties k1, n1, and d1 as shown on the graph. Similarly, optimized thin film material 202 has properties k2, n2, and d2 as shown on the graph.

Figure 3:
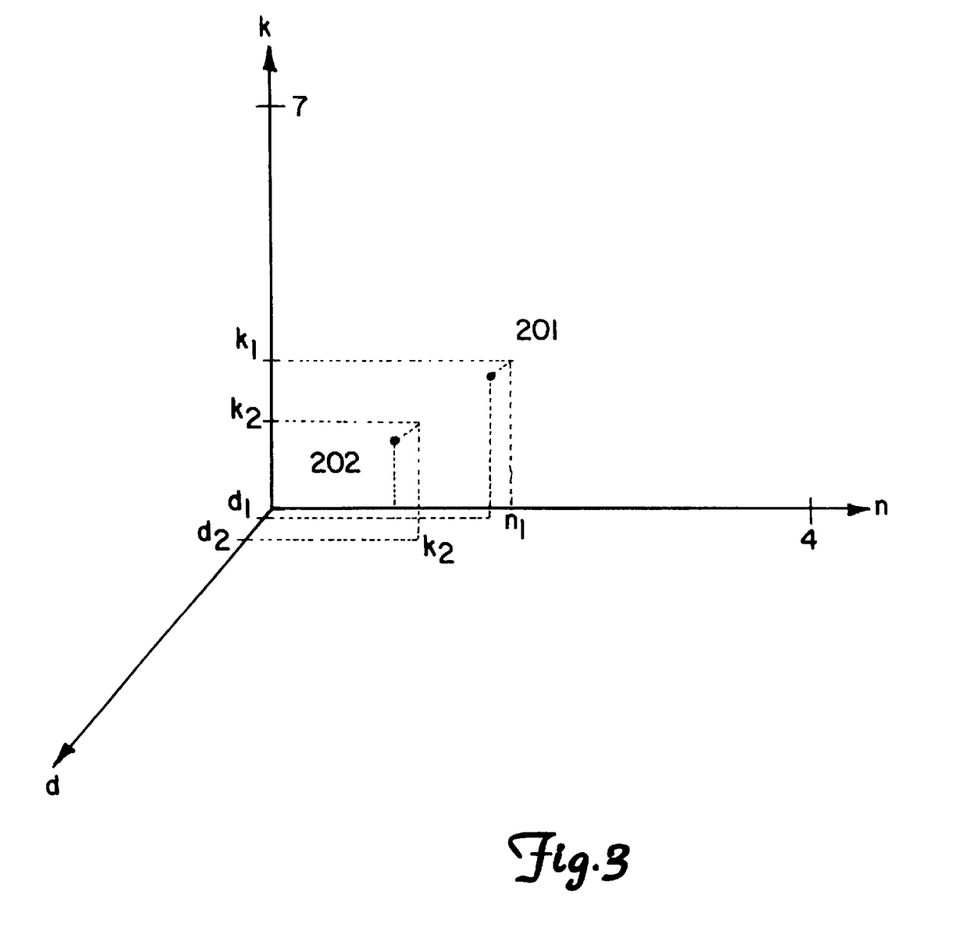
FIG. 3 is a three-dimensional graph which shows the properties of two optimized thin film materials.
Figure 4A:
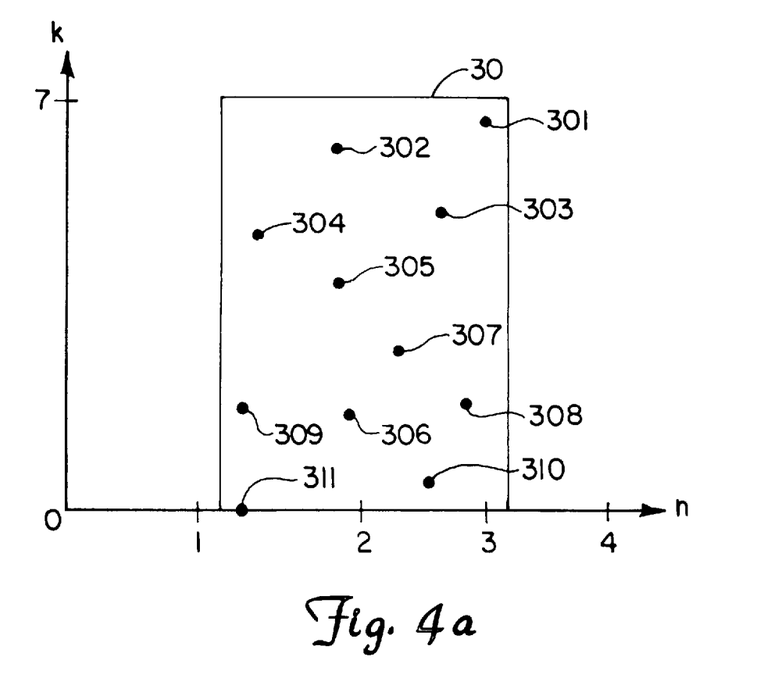
FIG. 4a is a two-dimensional graph showing properties of available thin film materials.

FIG. 4a is a two-dimensional graph of n and k values for eleven available thin film materials. Each of the materials is represented by a point on the graph of FIG. 4a. Again, the y axis corresponds to the absorption coefficient, and the x axis corresponds to the index of refraction. The z axis is not shown because it is assumed that these materials can also have any positive thickness value d. Thus, although not shown, each of the available materials would be represented in a three-dimensional graph similar to that of FIG. 3 as a line extending, from each of the points in the plane shown in FIG. 4a, in an orientation normal to the d=0 plane in the positive d direction.

Figure 4B:
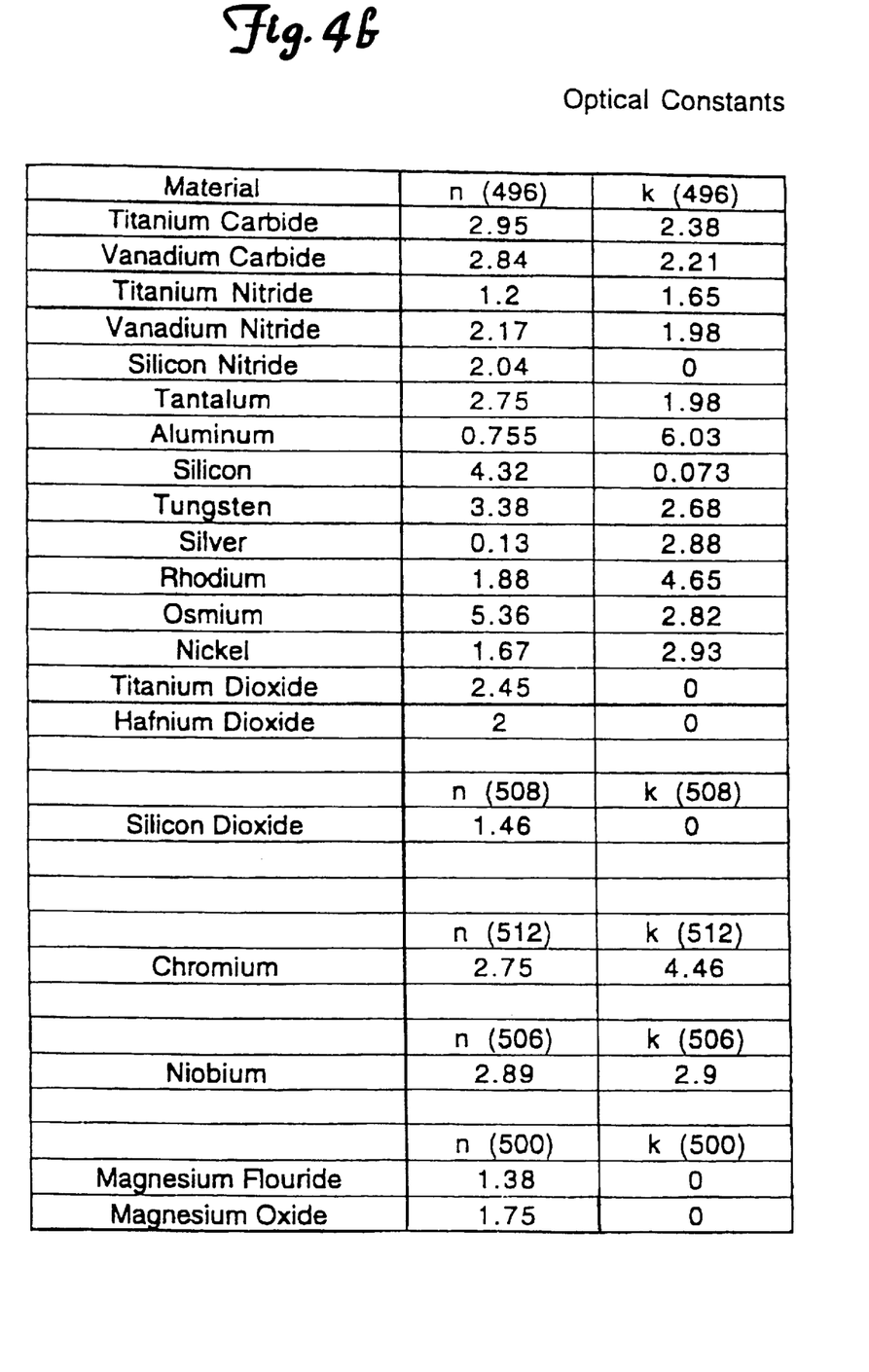
FIG. 4b is a list of available materials in a hypothetical design scenario.

In FIG. 4a, the eleven available materials are labelled at points that represent their respective n and k values. Material 308, for example, is Tantalum which has an index of refraction of 2.75, and an absorption coefficient of 1.98. Another example is Rhodium (labelled 305), which has an index of refraction of 1.88 and an absorption coefficient of 4.65. Magnesium Fluoride, which is a clear material (k=0) with n equal to 1.38, is shown as point 311. More materials may exist than those represented in FIG. 4a, but those shown are, for purposes of the example described in FIGS. 4a, and 5 through 7, assumed to be the only available materials. The available materials are generally herein defined to be those available for use in any given design. Thus, while the available thin film materials may include all existing thin film materials, the available materials will, as a practical matter, typically be only a subset of all existing thin film materials. A typical list of available materials that may be available for a given design is set forth in FIG. 4b.

Ideally, the optimized thin film materials 201 and 202 represented in FIG. 3 would coincide on the graph with two of the available materials represented by points 301 to 311 in FIG. 4a. This situation, where two available materials have the n and k values of the two optimized thin film materials 201 and 202, is ideal because one of the available materials can be used for each of the optimized materials in the design. As suggested above, however, it is rare that there will be available material having the properties necessary for a low layer count design. In the past, the failure to match the optimized n and k values with those of available thin film materials would mean that the design was not feasible without more layers.

Figure 5:
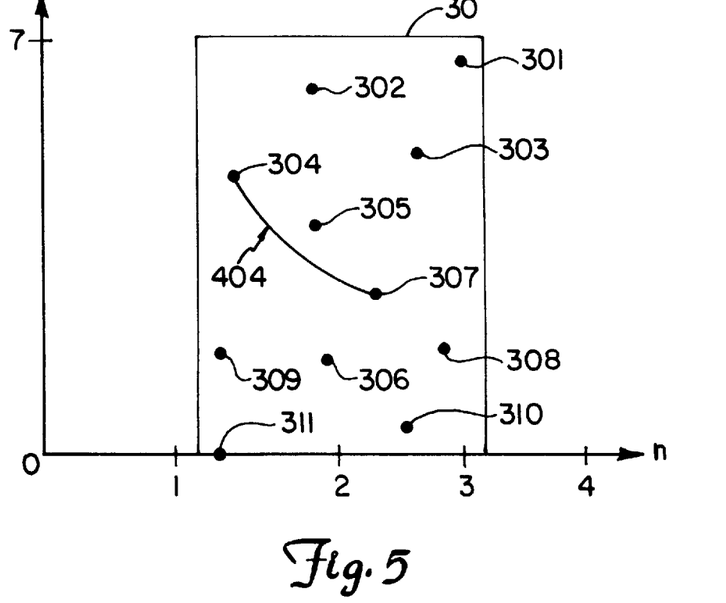
FIGS. 5 and 6 are two-dimensional graphs showing the effect of mixing multiple thin film materials.
Figure 6:
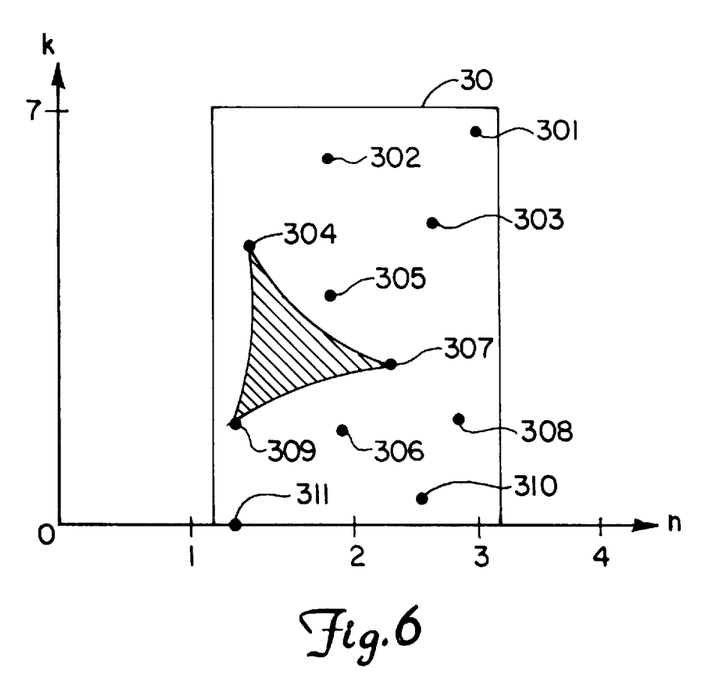

The present invention recognizes that although no available material may have the desired properties, in some circumstances it may be possible to manufacture materials that have the optimized (chosen) n and k values by mixing two or more of the available materials. Line 404 in FIG. 5 represents the index of refraction and absorption coefficient values for a thin film material that consists of a mixture of material 304 and material 307. Mixtures of material 304 and material 307 have properties that correspond to points along mixture line 404. The larger the percentage of material 304 that is in the mixture, the closer to point 304 the mixture will be. On the other hand, the larger the percentage of material 307 that is in the mixture, the closer the mixture will be to the point 307. Thus, as one skilled in the art will recognize from FIG. 5, it is possible to create a material with properties corresponding to a point along the mixture line 404 by mixing some proportion of materials 304 and 307.

Similarly, it is possible to create an even wider range of materials by mixing more than two materials. For example, in FIG. 6, mixture line 408 represents the properties of a mixture of material 304 and material 309, and mixture line 406 represents the properties of a mixture of material 309 and material 307. The shaded area 410 bounded by the mixture lines 404, 406, and 408 represents the custom materials that could potentially be manufactured by mixing some proportion of materials 304, 307, and 309. Thus, although a mixture of any two of the materials 304, 307, and 309 may not create a material that has properties that correspond to those inside the region 401, by mixing all three materials, it may be possible to create a material with properties that correspond to those of a point inside the region 410.

Manufacturing an optimized optical interference coating therefore involves mixing two or more materials to create the customized thin film material called for by the optimized design. The materials used for the mixture can be chosen by referencing a database of mixture information that sets forth what mixtures of given materials result in a thin film material that has a given n and k value. A mixture is herein defined to be some combination of two or more available materials, where at least two of the materials have no molecular bond. Thus, Magnesium Fluoride is not a mixture as herein defined because there is a molecular bond between Magnesium and Fluoride. A combination of Magnesium Fluoride and Nickel, however, is considered a mixture because there is no molecular bond between Nickel and Magnesium Fluoride.

The information in the database may be compiled by mixing layers in a test coater, and gathering empirical data representing the n and k values of the mixed materials. For example, to determine the points that form the line 404, materials 304 and 307 are mixed in varying proportions, and measurements of n and k for the mixture are taken. Preferably, a large number measurements of the materials at varying proportions are taken so that the shape of the line 404 can be accurately described. A curve is then fit to these points, so that the n and k values for all proportions of the materials 304 and 307 can be determined from the curve fitted to the measurements taken. Although less accurate, it is possible to estimate the position and curvature (if any) of the line 404 by measuring the n and k values for a single mixture of some proportion of materials 304 and 307. This measurement, along with the n and k values for the materials 304 and 307, represent three points on the mixture line 404, which is sufficient for fitting a curve along points 304 and 307 that has a constant radius of curvature. Although the line 404 may not actually have a constant radius of curvature, a curve fit to three points may provide a sufficiently accurate approximation of line 404.

When more than two thin film materials are to be mixed, the required proportions of the three materials can also be determined by empirical data stored in a database created from prior experiments. If data from a large number of mixtures representing varying proportions of the three materials are available in the database, it would be possible to estimate, with reasonable accuracy, what proportions of the three materials would be required to create a thin film material with the desired n and k properties.

Once it is determined what proportions of the available materials will be mixed to create the custom thin film material, the custom thin film material is then applied to the substrate in the manner, in the proportions, and in thicknesses called for by the design. This step is repeated for each layer in the design. The result is an optimized optical interference coating with a minimum amount of layers, where at least one of the layers is a customized thin film material created by mixing two or more available materials. In the two-layer example described above, available thin film materials are mixed to create two custom-mixed thin film materials, one with the properties of optimized material 201, and the other with the properties of optimized material 202. The custom-mixed material corresponding to optimized material 201 is applied as the first layer, and then the custom-mixed material corresponding to optimized material 202 is then applied as the second layer.

The present invention thus provides a systematic means for implementing low layer count optimized designs that were not previously feasible. However, even with the present invention, it may not be possible to implement some very low layer count designs. The success of the procedure depends on what thin film materials are available. For example, if we were to consider a single-layer anti-reflective design (as opposed to the two-layer design in the example above), a computer employing the present invention would find values of n, k, and d that will set the reflectance equal to (or substantially equal to) zero in the single layer equations of FIG. 2.

Figure 7:
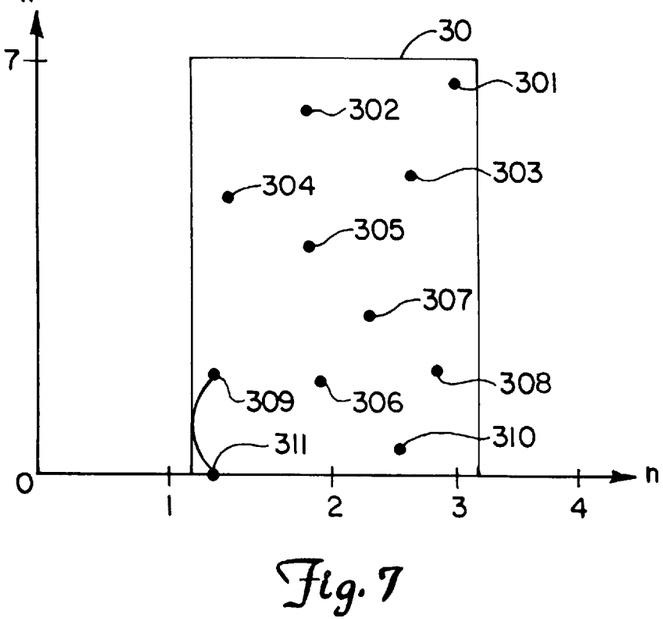
FIGS. 7 and 8 are two-dimensional graphs showing the properties of an optimized thin film material in a design with a very low layer count.

The computer may then attempt to determine which combination of available thin film materials will, when mixed, result in a custom thin film material with the desired n, k, and d values (i.e., those n, k, and d values that set the reflectance to the desired value). With only a single layer, it may not be possible to custom manufacture a single thin film material with the desired properties from a limited number of available materials. To illustrate such a case, consider FIG. 7, which is a graph of n and k values (301 to 311) for the available thin film materials. Also shown in FIG. 7 is point 101, which represents the n and k values that set the reflectance to zero in the single-layer equations of FIG. 2. As can be seen, the point 101 is well outside the range of the available thin film materials (the range is generally represented by the box 30). Where the desired thin film material properties are not in the range of available materials, no combination of the available materials will duplicate the desired n and k values. Thus, some designs with only a small number of layers may not be possible with a given set of available materials.

The manufacture of the thin film materials can be done in a number of ways. One way to custom-manufacture a thin film material is to mix two or more available thin film materials using two targets in a sputtering process, where each of the targets is a different one of the available thin film materials. For example, one target may be chrome, and the other target may be silicon. When both targets are used simultaneously, the resulting material is some mixture of chrome and silicon. Another method of mixing two materials is to use a mixed target, such as, for example, a Nickel and Silicon target, which can be manufactured with plasma spray technology as is known in the art. Sputtering with such a target will result in some mixture of Nickel and Silicon being applied to the substrate. In addition, these two targets coupled with the injection of a reactive gas into the chamber will effectively mix three materials. For example, a custom material consisting of some combination of Nickel, Silicon, and Oxygen can be created by injecting oxygen into a sputtering chamber that employs both a Nickel target and a Silicon target. Various other methods of mixing materials are known in the art, and any known mixture technique is intended to be within the scope of the present invention. The operation of the present invention is not dependent upon the manner in which a mixed material is created.

Figure 1C:
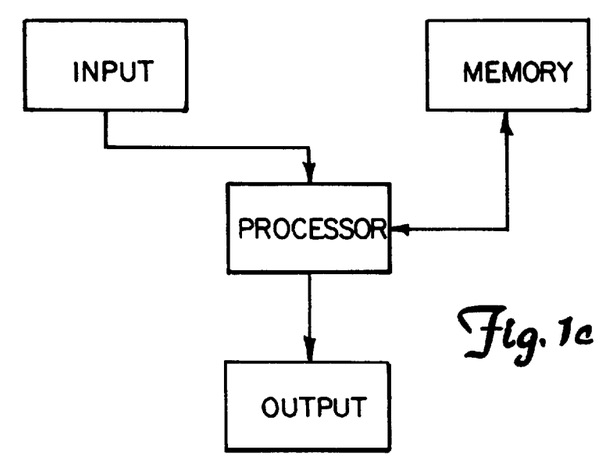
FIG. 1c is a block diagram of the functional elements of a computer for use in connection with the preferred embodiment of the present invention.
Figure 8:
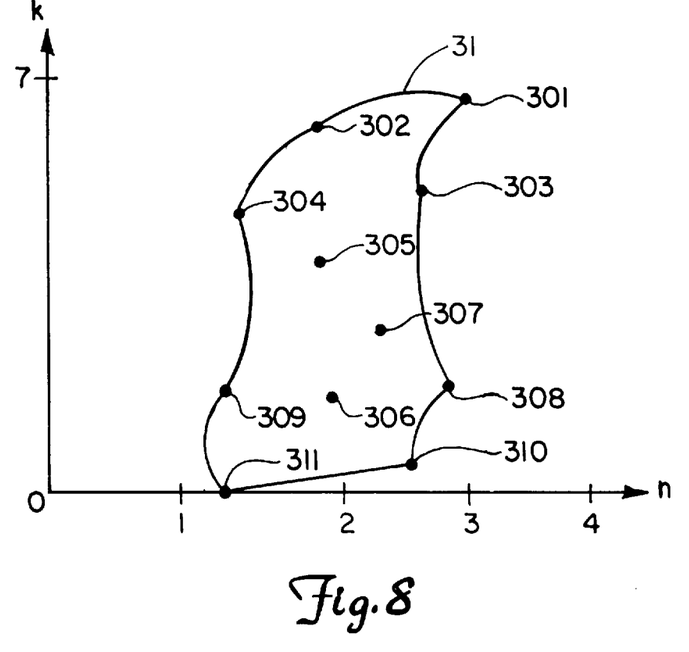

As described, some of the steps carried out by the present invention would be performed by a general purpose computer, such as than shown in FIG. 1c. Appropriate software would determine a layer count which would simply be the desired number of layers in the optical interference coating design. This information could be established by user input, as described above. In some embodiments, the software may also determine an absorption coefficient range and an index of refraction range, where both ranges have an upper and lower bound. These bounds (represented by, for example, the box 30 in FIG. 7) would be used to determine if it is possible, using the available thin film materials, to create a customized thin film material with the desired properties. In the preferred implementation, a more complicated boundary would be defined, such as that represented by mixture lines collectively referred to as 31 in FIG. 8. This boundary is more accurate than the two-dimensional rectangle of FIG. 7 because the area outlining the set of properties within the reach of mixtures of the available materials is not typically rectangular. The information that defines the actual boundary can be more accurately estimated from the mixture lines that form the periphery of the available material region, as shown in FIG. 8. This information may be retrieved from the database of available thin film materials and information about mixtures.

Also as described above, the software would also find, for each of the layers, three optimized values (n, k, and d) that will cause the reflectance of an object coated with the anti-reflective coating to be substantially zero for the given wavelength. Once the optimized values are determined by solving the reflectance equations in the manner described above, they may be checked (or possible solutions may be initially limited to) values that are within the absorption coefficient range, and the index of refraction range. In addition, the optimized thickness value for each of the layers must obviously be greater than zero. Thus, the boundary 31 or the absorption coefficient range and the index of refraction range define some constraints that limit the possible solutions to the reflectance equations.

The software also determines what proportions of the available materials would create a customized material with the desired n and k values. As described above, this could be done by referencing a database with information describing the various mixture lines between each materials. In addition, mixture areas created by three or more materials could also be identified as covering the desired n and k values.

Figure 9:
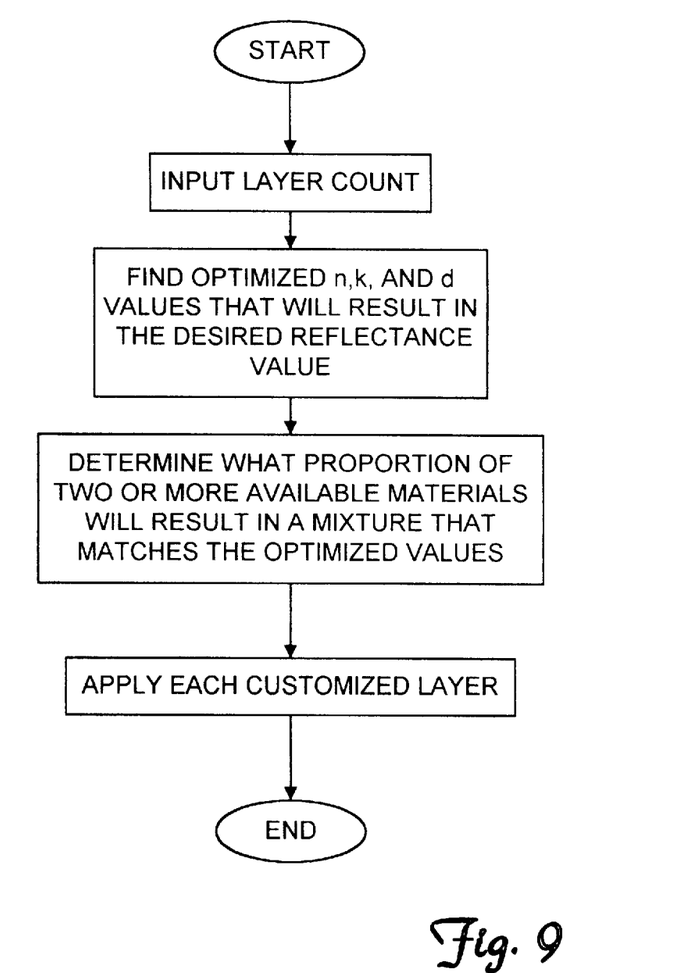
FIGS. 9 and 10 are flow-charts of the steps carried out by a computer employing the present invention.
Figure 10:
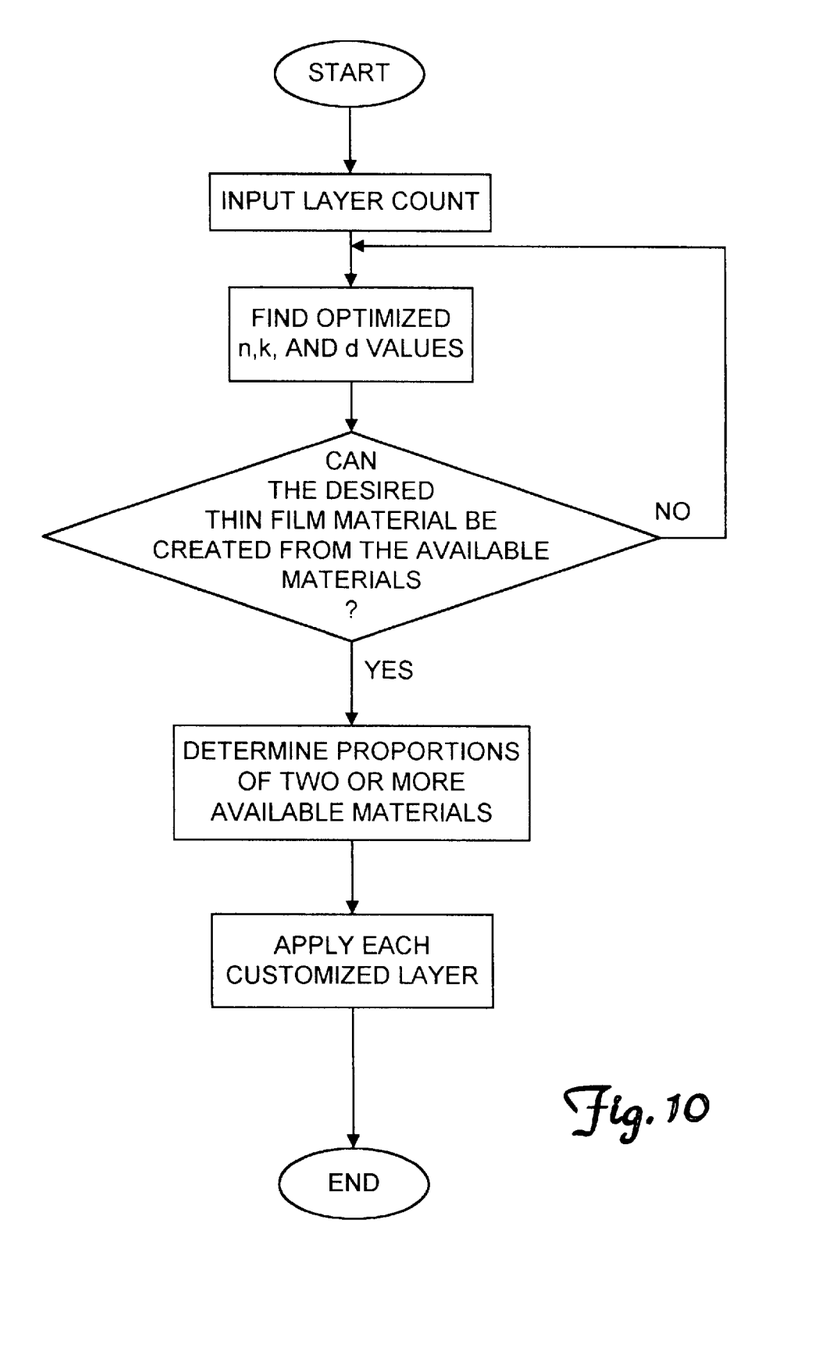

FIGS. 9 and 10 are flow charts showing the steps carried out by different embodiments of the present invention. FIG. 9 shows that the first step after determining the layer counts is to find optimized values that will cause the desired reflectance result. The next step is to determine, for each of the layers, what proportions of two or more available materials can be used to manufacture a mixture that matches the optimized values. The final step is to apply to the substrate the resulting customized mixtures as layers.

FIG. 10 is similar to that of FIG. 9, but in FIG. 10, feasibility checking is performed to determine if a customized material with the optimized values can be created from the available materials. This may be done by checking the optimized values against the n and k ranges (e.g., the boundaries) in the manner described in connection with FIGS. 7 and 8.

The software is stored on a data storage medium that is accessible by the computer in a manner known in the art. The effective implementation of the present invention is neither dependent on the type of computer employed, nor dependent upon the type of storage medium employed. The data storage medium could be of any type (including, without limitation, optical, magnetic, or hardware-based storage media).

Although the present invention has been shown and described with respect to preferred embodiments, various changes and modifications that are obvious to a person skilled in the art to which the invention pertains, even if not shown or specifically described herein, are deemed to lie within the spirit and scope of the invention and the following claims. In the claims, any means-plus-function clauses are intended to encompass not only structural equivalents but also equivalent structures.

What is claimed is:

1. A method of operating a computer to design an anti-reflective coating that is optimized for a given wavelength, wherein the anti-reflective coating comprises one or more layers, the method comprising the acts of:

accepting as input a layer count value, wherein the layer count value is the number of layers that will make up the anti-reflective coating;

finding, for each of the layers, three optimized values that will cause the reflectance properties of a substrate coated with the anti-reflective coating to be non-reflective for the given wavelength, wherein the three optimized values for each layer comprise an optimized absorption coefficient, an optimized index of refraction, and an optimized thickness, and wherein the three optimized values for at least one layer are all greater than zero; and determining, for each of the layers, what proportion of two or more available thin film materials will result in a mixture that will match the three optimized values.

2. The method of claim 1, further comprising the act of:

applying the mixture of the available materials to the substrate in the determined proportions.

3. The method of claim 1, wherein the act of determining, for each of the layers, what proportion of two or more available thin film materials will result in a mixture that will match the three optimized values includes the act of:

selecting, for each of the layers, two or more available thin film materials.

4. The method of claim 3, further comprising the acts of:

mixing, for each of the layers, the selected available thin film materials; and applying the mixture to the substrate.

5. The method of claim 1, wherein the two or more available thin film materials are combined in a mixture where the two or more available thin film materials are not bonded by a molecular bond.

6. A system for designing an anti-reflective coating that is optimized for a given wavelength, wherein the anti-reflective coating comprises one or more layers, the system comprising:

(a) a computer; and (b) a data storage medium that is accessible by the computer, wherein the data storage medium has a program stored on it that is capable of being executed by the computer, and that is configured to cause the computer to:

accept as input a layer count value, wherein the layer count value is the number of layers that will make up the anti-reflective coating, find, for each of the layers, three optimized values that will cause the reflectance properties of a substrate coated with the anti-reflective coating to be non-reflective for the given wavelength, wherein the three optimized values for each layer comprise an optimized absorption coefficient, an optimized index of refraction, and an optimized thickness, and wherein the three optimized values for at least one layer are all greater than zero, and determine, for each of the layers, what proportion of two or more available thin film materials will result in a mixture that will match the three optimized values.

7. The system of claim 6, further comprising:

(c) a coating mechanism that is capable of coating the substrate, and which is controlled by the computer;

wherein the computer program is further configured to cause the computer to control the coating mechanism so that the mixture of the available materials is applied to the substrate in the determined proportions.

8. The system of claim 6, wherein the program is further configured to cause the computer to:

select, for each of the layers, two or more available thin film materials.

9. The system of claim 8, further comprising:

(c) mixing means for applying the selected available thin film materials; and (d) coating means for applying the mixture to the substrate.

10. The system of claim 9, wherein the selected two or more available thin film materials are combined in a mixture where the two or more selected available thin film materials are not bonded by a molecular bond.

11. A system for designing an anti-reflective coating that is optimized for a given wavelength, wherein the anti-reflective coating comprises one or more layers, the system comprising:

means for accepting as input a layer count value, wherein the layer count value is the number of layers that will make up the anti-reflective coating;

means for finding, for each of the layers, three optimized values that will cause the reflectance of a substrate coated with the anti-reflective coating to be substantially zero for the given wavelength, wherein the three optimized values for each layer comprise an optimized absorption coefficient, an optimized index of refraction, and an optimized thickness, and wherein the three optimized values for at least one layer are all greater than zero; and means for determining, for each of the layers, what proportion of two or more available thin film materials will result in a mixture that will match the three optimized values.

12. The system of claim 11, further comprising:

means for applying the mixture of the available materials to the substrate in the determined proportions.

13. A method of operating a computer to design an anti-reflective coating, wherein the anti-reflective coating comprises one or more layers, the method comprising the acts of:

accepting as input a layer count value, wherein the layer count value is the number of layers that will make up the anti-reflective coating;

finding, for each of the layers, three optimized values that will cause the reflectance properties of a substrate coated with the anti-reflective coating to be non-reflective, wherein the three optimized values for each layer comprise an optimized absorption coefficient, an optimized index of refraction, and an optimized thickness, and wherein the three optimized values for at least one layer are all greater than zero; and determining, for each of the layers, what proportion of two or more available thin film materials will result in a combination that will match the three optimized values.

* * * * *